(12) United States Patent
Varhaniovsky

(10) Patent No.: US 9,272,847 B2
(45) Date of Patent: Mar. 1, 2016

(54) TRANSPORT SYSTEM FOR PACKAGES AND APPARATUS FOR HANDLING PACKAGES USING SUCH A TRANSPORT SYSTEM

(75) Inventor: Gyula Varhaniovsky, Waltrop (DE)

(73) Assignee: KHS GmbH, Dortmund (DE)

( * ) Notice: Subject to any disclaimer, the term of this patent is extended or adjusted under 35 U.S.C. 154(b) by 11 days.

(21) Appl. No.: 14/342,428

(22) PCT Filed: Jun. 29, 2012

(86) PCT No.: PCT/EP2012/002742
§ 371 (c)(1),
(2), (4) Date: Mar. 3, 2014

(87) PCT Pub. No.: WO2013/029710
PCT Pub. Date: Mar. 7, 2013

(65) Prior Publication Data
US 2014/0202831 A1  Jul. 24, 2014

(30) Foreign Application Priority Data
Sep. 2, 2011 (DE) .......................... 10 2011 112 300

(51) Int. Cl.
*B65G 47/84* (2006.01)
*B65G 37/00* (2006.01)
*B41J 3/407* (2006.01)
*B65B 61/02* (2006.01)

(52) U.S. Cl.
CPC .............. *B65G 37/00* (2013.01); *B41J 3/4073* (2013.01); *B65B 61/025* (2013.01); *B65G 47/846* (2013.01); *B65G 2201/0244* (2013.01)

(58) Field of Classification Search
CPC ...... B65B 61/02; B65B 61/025; B65G 47/84; B65G 47/846
See application file for complete search history.

(56) References Cited

U.S. PATENT DOCUMENTS

| 3,915,288 | A | | 10/1975 | Szpitalak | |
|---|---|---|---|---|---|
| 4,467,847 | A | * | 8/1984 | Zodrow | 141/98 |
| 4,723,661 | A | | 2/1988 | Hoppmann | |
| 6,058,985 | A | * | 5/2000 | Petri | B67C 7/002 141/129 |
| 6,079,546 | A | * | 6/2000 | Marti Sala | B65G 17/32 198/465.1 |
| 6,176,369 | B1 | * | 1/2001 | Petrovic | B65G 17/002 198/803.14 |
| 6,276,113 | B1 | * | 8/2001 | Bernhard | B67C 7/002 53/253 |
| 6,317,648 | B1 | * | 11/2001 | Sleep | B65B 5/103 53/500 |
| 6,452,133 | B1 | * | 9/2002 | Geerke | A61K 9/0004 219/121.71 |
| 7,587,879 | B2 | * | 9/2009 | Guttinger | B65B 5/068 53/169 |

(Continued)

FOREIGN PATENT DOCUMENTS

| CN | 1756633 | 4/2006 |
|---|---|---|
| CN | 101218159 | 7/2008 |

(Continued)

*Primary Examiner* — Gene Crawford
*Assistant Examiner* — Thomas Randazzo
(74) *Attorney, Agent, or Firm* — Occhiuti & Rohlicek LLP

(57) ABSTRACT

An apparatus for transporting packages from an inlet to an outlet includes a closed transport path having a package transport route and a puck return transport route, an inlet, an outlet, transport elements that are rotatable in a circulation direction and that are adjacent to each other in the transport direction of the packages, and pucks for carrying a package from the inlet to the outlet. After release of the packages at the outlet, the pucks return to the inlet via the puck return transport route. The puck return transport route and the package transport route are in transport planes offset from each other in a vertical direction. The two transports are formed by common transport elements.

17 Claims, 5 Drawing Sheets

(56) References Cited

U.S. PATENT DOCUMENTS

| | | | |
|---|---|---|---|
| 7,731,022 B2 * | 6/2010 | Zepf | 198/860.1 |
| 7,866,123 B2 * | 1/2011 | Clusserath | B67C 3/22 141/144 |
| 8,701,865 B2 * | 4/2014 | Forni | B65G 11/203 198/384 |
| 8,978,552 B2 * | 3/2015 | Preckel | B41J 3/4073 101/171 |
| 8,985,309 B2 * | 3/2015 | Drenguis | B08B 9/205 198/403 |
| 2003/0145901 A1 | 8/2003 | Noell | |
| 2004/0011623 A1 * | 1/2004 | Sala | B65G 47/1471 198/373 |
| 2007/0169433 A1 | 7/2007 | Koster et al. | |
| 2010/0257818 A1 * | 10/2010 | Ripkens | B65B 21/06 53/410 |

FOREIGN PATENT DOCUMENTS

| | | | | |
|---|---|---|---|---|
| CN | 102164833 | | 8/2011 | |
| CN | 102165833 | | 8/2011 | |
| DE | 10 2009 043 497 | | 3/2011 | |
| DE | WO2011/038827 | * | 4/2011 | B65B 61/02 |
| DE | WO2011/101007 | * | 8/2011 | B08B 9/20 |
| EP | 1 595 699 | | 11/2005 | |
| EP | 2239215 | | 10/2010 | |
| JP | 2007-500658 | | 1/2007 | |

* cited by examiner

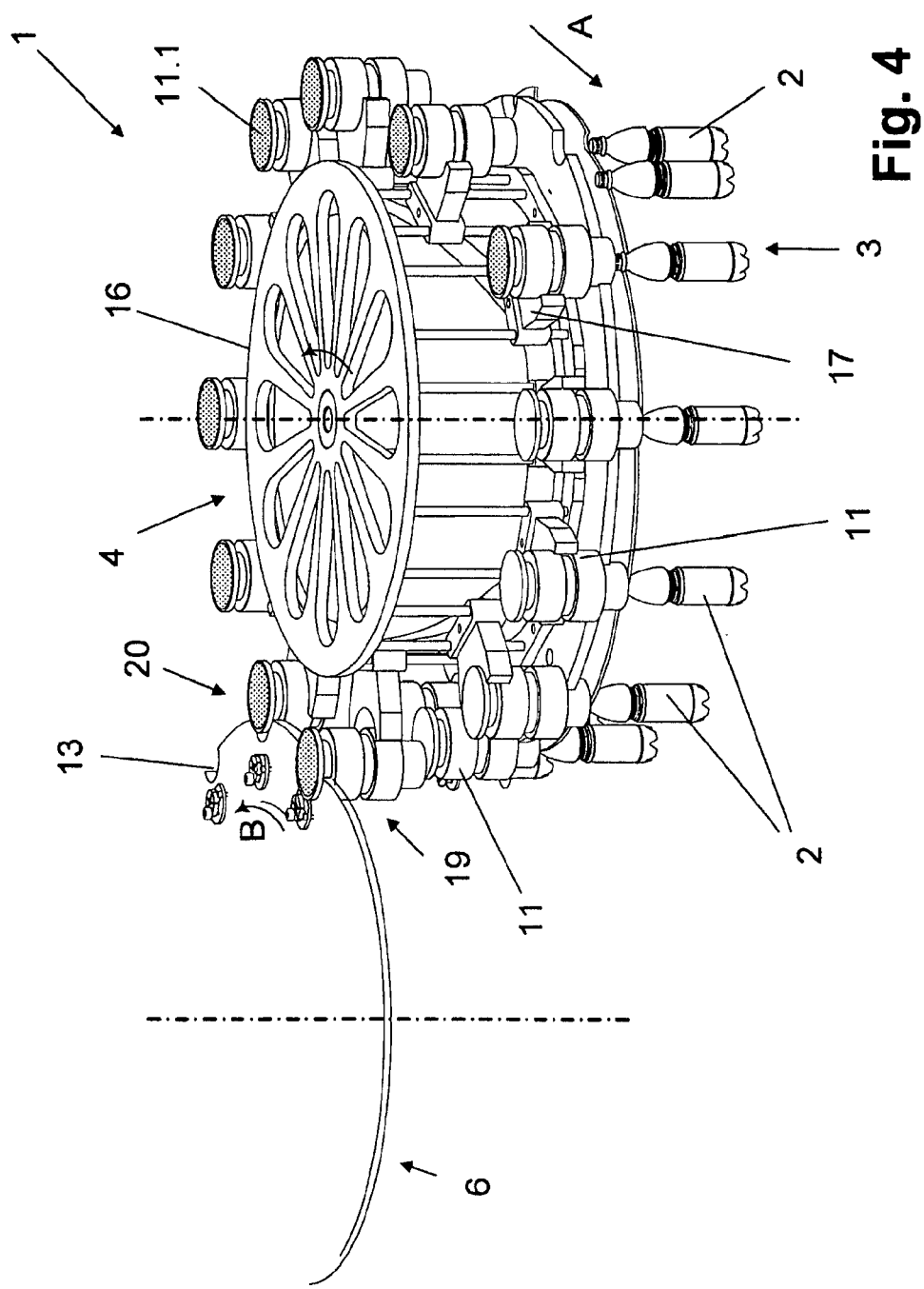

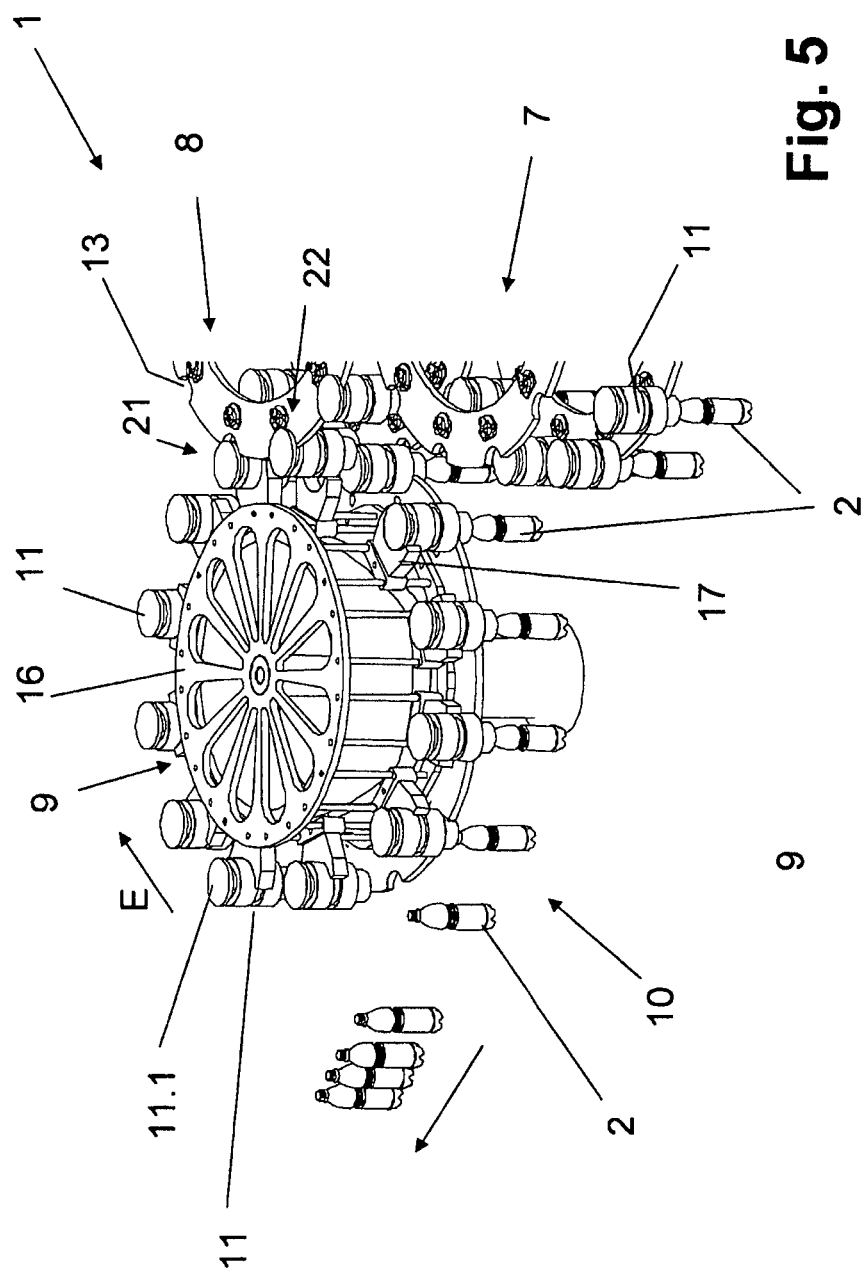

TRANSPORT SYSTEM FOR PACKAGES AND APPARATUS FOR HANDLING PACKAGES USING SUCH A TRANSPORT SYSTEM

RELATED APPLICATIONS

This application is the national stage entry under 35 USC 371 of PCT/EP2012/002742, filed on Jun. 29, 2012, which claims the benefit of the Sep. 2, 2011 priority dates of German applications DE 10 2011 112 300.1, the contents of which are herein incorporated by reference in their entirety.

FIELD OF INVENTION

The invention relates to a transport system for handling packages.

BACKGROUND

Transport systems for transporting packages from a package inlet to a package outlet are known from DE 10 2009 043 497 A1. A feature of these transport systems is that throughout the entire transport path, from the package inlet to the package outlet, the packages are held on one and the same holding-and-centering unit, or "puck," and the holding-and-centering units only release the packages at the package outlet, from which the holding-and-centering units are then returned to the package inlet on a puck return transport route.

SUMMARY

The object of the invention is to produce a transport system of the generic type that can be implemented with high operating reliability, reduced constructional costs and in compact construction.

In the transport system according to the invention, at least some, and preferably all, of the transporting elements forming the packaging transport route also form the puck return transport route, or the latter is formed preferably exclusively by the transporting elements of the package transport route. This allows a reduction in the number of transporting elements necessary and/or the necessary transport routes for the closed puck circulation or the closed transport path of the puck, which in turn results in a significant reduction in the construction volume of the transport system.

"Package" in the sense of the invention includes packs or containers that are used in the foodstuff sector and particularly in the drinks sector, and in particular containers such as bottles, cans, and soft packs, for example those made of cardboard, plastic film, metal film, and combinations thereof.

A "puck" in the sense of the invention is a holding, centering, and orientation unit for the package on which the respective package is held and moved from the package inlet to the package outlet through a package transport route of the transport system, and that preferably also causes a controlled orientation of the respective package for its treatment. The puck can comprise a motorized drive. Or it can itself form part of a motorized drive for rotating the respective package about its vertical axis.

The individual holding-and-centering units are fixedly connected, at least for the drive, to an electric actuator or at least to a function element, for example a rotor of such an actuator, or are provided on the transporting elements with actuators moved therewith, which are then coupled thereto after delivery of the respective holding-and-centering unit, so that, by means of the actuators, the package or their neutral position can be oriented, and/or the package can be rotated about an axis for printing. Suitable incremental emitters, sensors, and detection and data processing devices for rotary angle determination or control are known.

"Transport elements or transport stars adjacent to each other for transport" in the sense of the invention includes transport elements or transport stars that are configured and arranged such that, at the delivery regions, they receive the pucks from a transport element upstream in the transport direction, hold them, and pass them on to the transport element downstream in the transport direction.

The expression "substantially" or "approximately" in the sense of the invention includes deviations from the precise value by +/−10%, preferably by +/−5% and/or deviations in the form of changes insignificant to function.

Refinements, advantages and possible applications of the invention arise from the description below of exemplary embodiments and the figures. All features described and/or shown in the figures, alone or in any combination, form the fundamental object of the invention irrespective of their summary in the claims or back reference. The content of the claims is also made an integral part of the description.

In particular, a holding-and-centering unit has a secondary part holding the package, bottle, or container that is mounted on or in a primary part so as to be rotatable about a vertical axis and drivable, and furthermore drivable by motor. Here, in one embodiment, which can be regarded as preferred, it is provided that the secondary part forms the rotor of an electromagnetic direct drive for ensuring the controlled orientation and/or rotation of the respective package. For this, preferably, the secondary part is provided with a permanent magnet arrangement that cooperates with a stator of the electromagnetic direct rotary drive or with an electromagnetic arrangement forming this stator.

Alternatively, the secondary part can also be a stepless controllable electric motor, in particular a servomotor, or it can comprise such a motor as a main component. In this case the primary part comprises the motor housing as a main component, or substantially consists of the motor housing of a stepless controllable motor.

Since the angular position of the rotor must relate to the package at all times, ideally at least one coding for the rotary angle position is provided on the secondary part or also on the primary part. The coding can cooperate with a suitable sensor or read unit, in particular with one or more incremental sensors at the respective working position. Furthermore, alternatively or additionally, the rotary angle of the primary part can always be clearly determined relative to the respective handling stations. A form-fit holder, centering unit or a coupling element is provided so that only the rotary angle position of the secondary part relative to the primary part need be detectable by a sensor, read unit etc. The position relative to the printing segment or printing head can be derived from this.

When printing an empty package, in particular empty PET, PEN, PE or PP bottles, it is normal for the package to be under a slight positive pressure. To achieve this, at the holding-and-centering unit, a counterpart to a coupling element on the machine or printing-segment side is provided. This counterpart is formed in the manner of a fast coupling. In this way a vapor or gas medium, e.g. compressed air, can be conducted into the package through an inner pipe, such as the hollow interior of the puck. The lower outlet from this inner pipe ideally forms a central centering element or cone. To achieve this, at least one transport and handling unit, ideally the first is connected with a vapor or gas source or comprises a suitable compressor.

In some embodiments, either the counterpart to the coupling is formed as a non-return valve, or a non-return valve is provided in the inner pipe. As a result, after pre-tensioning with a vapor and/or gas, e.g. compressed air, this pressure can be maintained in the package over the entire package transport or printing route.

BRIEF DESCRIPTION OF THE DRAWINGS

The invention is explained in more detail below with reference to an exemplary embodiment show in the figures, in which:

FIGS. 4 and 5 shows an enlarged perspective view of the transport star forming a package inlet and a package outlet.

DETAILED DESCRIPTION

Figure 1:
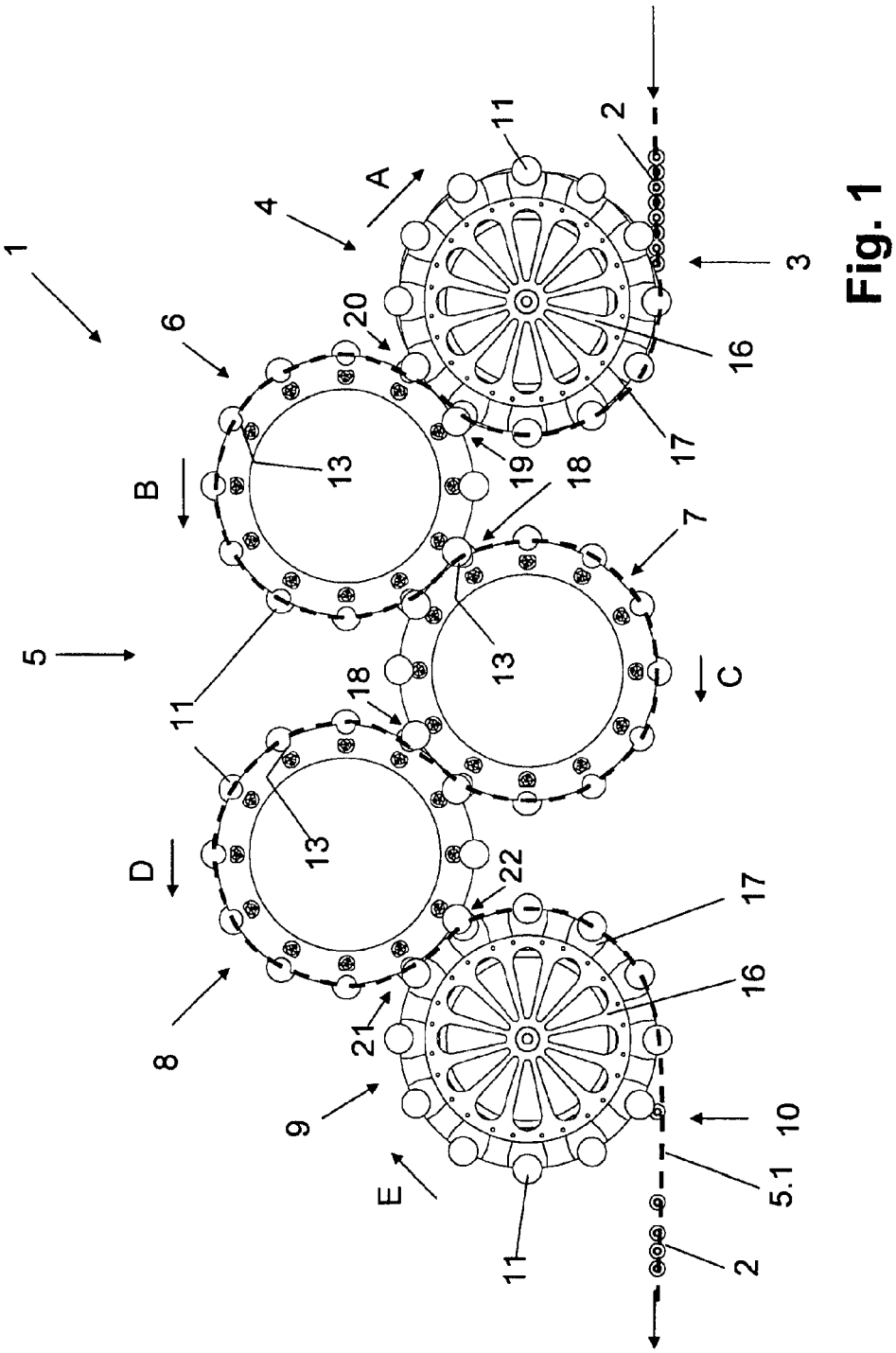
FIG. 1 shows a top view of a transport system of an apparatus for handling package in the form of bottles according to the invention.

The transport system 1 in the figures is part of an apparatus for handling packages 2, such as containers or bottles. In particular, the transport system 1 is, for example, part of an apparatus for applying at least one decoration to each package 2, for example for applying multicolored printing of the package 2.

The main working method of the transport system 1 or the apparatus with this transport system can be described as follows: the package 2 to be treated is supplied to a package inlet 3 at the necessary machine spacing, by a device that not shown, via an inlet star 4 that forms the package inlet 3, delivered to a package transport route 5, which in the embodiment shown is formed by three rotor-like transporting elements or transport stars 6, 7 and 8 that can be driven to rotate and that are adjacent to each other for transport.

The packages 2 are treated on the package transport route 5, and for this are moved with the rotating transporting elements 6-7 past the treatment stations, which are not shown. Examples of treatment stations include printing stations or printing heads for application of a multicolor prints to each package 2. After treatment, the packages 2 reach a package outlet 10 via an outlet star 9, via which the treated packages 2 are delivered to a further process and/or treatment station. The actual transport route 5.1 of the package 2, i.e. the path of the package 2 along the transporting elements, is indicated as a dotted line.

The inlet star 4, transport stars 6-7 and the outlet star can be driven in circulation about a vertical machine axis, namely in the depictions shown in FIG. 1, the inlet star 4 in a clockwise direction corresponding to arrow A, the transport star 6 following the inlet star 4 counterclockwise according to arrow B, the transport star 7 following transport star 6 clockwise according to arrow C, the transport star 8 following transport star 7 counterclockwise according to arrow D, and the outlet star 9 following the transport star 8 clockwise according to arrow E.

Figure 3:
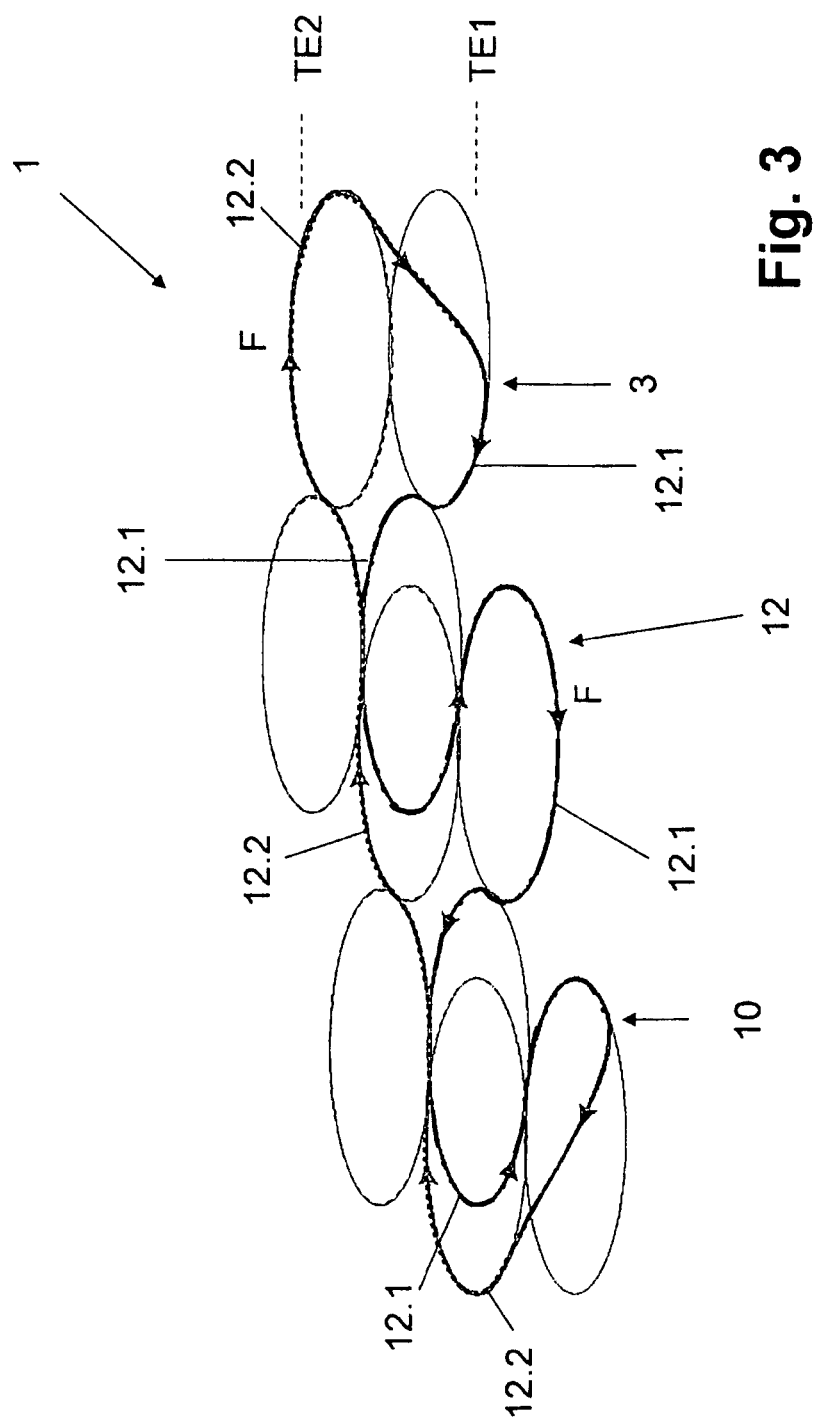
FIG. 3 shows a circulation path of the puck in the transport system of FIGS. 1 and 2.

One feature of the transport system 1 is that each package 2 is picked up at the package inlet 3, i.e. on delivery from the inlet star 4, at its package top or mouth by a package holding, centering, and orientation unit, i.e. a puck 11, and held suspended from one and the same puck 11 during transport through the entire transport system 1 from the package inlet 3 to the package outlet 10. Only at the package outlet 10 is each package 2 released from its associated puck 11. The empty pucks 11, i.e. the pucks without package 2, are returned to the package inlet 3 via the transport system 1 or a puck return transport route. According to FIG. 3 therefore there is a closed transport path 12 for the pucks 11 (puck circulation) on which they are moved according to the arrows F, namely in the embodiment shown in a lower, horizontal or substantially horizontal plane TE1 along the part route 12.1 shown in dash-dotted lines from the inlet star 4 to the outlet star 9, and then in an upper, also horizontal transport plane TE2 along the part route 12.2 forming the puck return transport route (shown in dotted lines) from the outlet star 9 back to the inlet star 4.

In the embodiment shown, the entire transport path 12 runs exclusively via the inlet star 4, transport stars 6-8 and outlet star 9. The part route 12.1 corresponds to the package transport route 5, which is repeatedly deflected in the manner of a meander, and on which the package 2 held by the pucks 11 are transported from the package inlet 3 to the package outlet 10, and on which treatment takes place of the package 2 oriented by the pucks 11, for example packages 2 centered and oriented by controlled rotation or pivoting about their vertical package axis. The part route 12.2 is also repeatedly deflected as a meander, but opposite to the course of the part route 12.1. Also in the embodiment shown, the part route 12.2 is shorter than part route 12.1.

Transport stars 6-8 in the embodiment shown are formed in two levels, i.e. they are formed in two planes offset from each other in the vertical direction and that correspond to the lower transport plane TE1 and the upper transport plane TE2. On their periphery, the transport stars 6-8 each have several puck holders 13, each of which holds a puck 11. The puck holders 13 are arranged at even angular distances about the machine axis of the transport stars 6-8 and at the same radial distance from this axis. The puck holders 13 are fitted with grippers and/or holders, namely to collect the puck 11 from a transport element upstream in the transport direction (inlet star 4, outlet star 9 or transport stars 6-8), to hold the puck 11, and to pass the puck 11 on to the transporting element downstream in the transport direction (inlet star 4, outlet star 9 or transport stars 6-8).

The inlet star 4, transport stars 6-8 and outlet star 9 thus form transporting elements for moving the puck 11 on the closed transport path 12 and for moving the package 3 held on the pucks on the part route 12.1. In the embodiment shown, the transport stars 6-8 are formed identically such that the radial distance of the puck holders 13 of the lower transport plane TE1 from the rotary or machine axis of the respective transport star 6-8 is the same as the distance of the puck holders 13 in the upper transport plane TE2 from the rotary or machine axis. Also, vertically above each puck holder 13 of the lower transport plane TE1 there is a puck holder 13 of the upper transport plane TE2.

As shown in the figures, the transport planes 6-8 are formed in the manner of ring cages and/or wheel spokes. For the sake of simplicity of depiction, only one lower ring 14 and one upper ring 15 are shown, on the periphery of which the puck holders 13 are provided.

The inlet star 4 and the outlet star 9 in the embodiment shown are formed identically. Each has a rotor 16 that can be driven in circulation about the vertical axis, and several holders 17 that are arranged on the periphery of the rotor at even angular distances and at the same radial distance from the rotary or machine axis, and that in turn are provided with suitable receiving, holding and delivery elements, for example in the form of grippers, for the pucks 11.

The mutual pitch spacing of the holders 17 at the inlet star 4 and outlet star 9 is the same as the mutual pitch spacing of the puck holders 13 in the transport planes TE1 and TE2 at transport stars 6-8 so that with transport elements driven in synchrony (inlet star 4, outlet star 9 and transport stars 6-8), whenever a puck holder 13 of a transport star 6-8 has reached a delivery region 18 between two adjacent transport stars 6-8, a puck holder 13 of the adjacent transport star 6-8 is there ready for delivery and/or reception of a puck 11. Furthermore whenever two puck holders 17 of the inlet star 4 have reached the two delivery regions 19 and 20 between the inlet star 4 and the adjacent transport star 6, or whenever two puck holders 17 of the outlet star 9 have reached the two delivery regions 21 and 22 between the outlet star 9 and the adjacent transport star 8, at each of these delivery regions a puck holder 13 is ready for delivery or reception of a puck 11. The delivery regions 18 are each provided in pairs, namely a delivery region 18 in the lower transport plane TE2 and a delivery region in the upper transport plane TE1.

Figure 2:
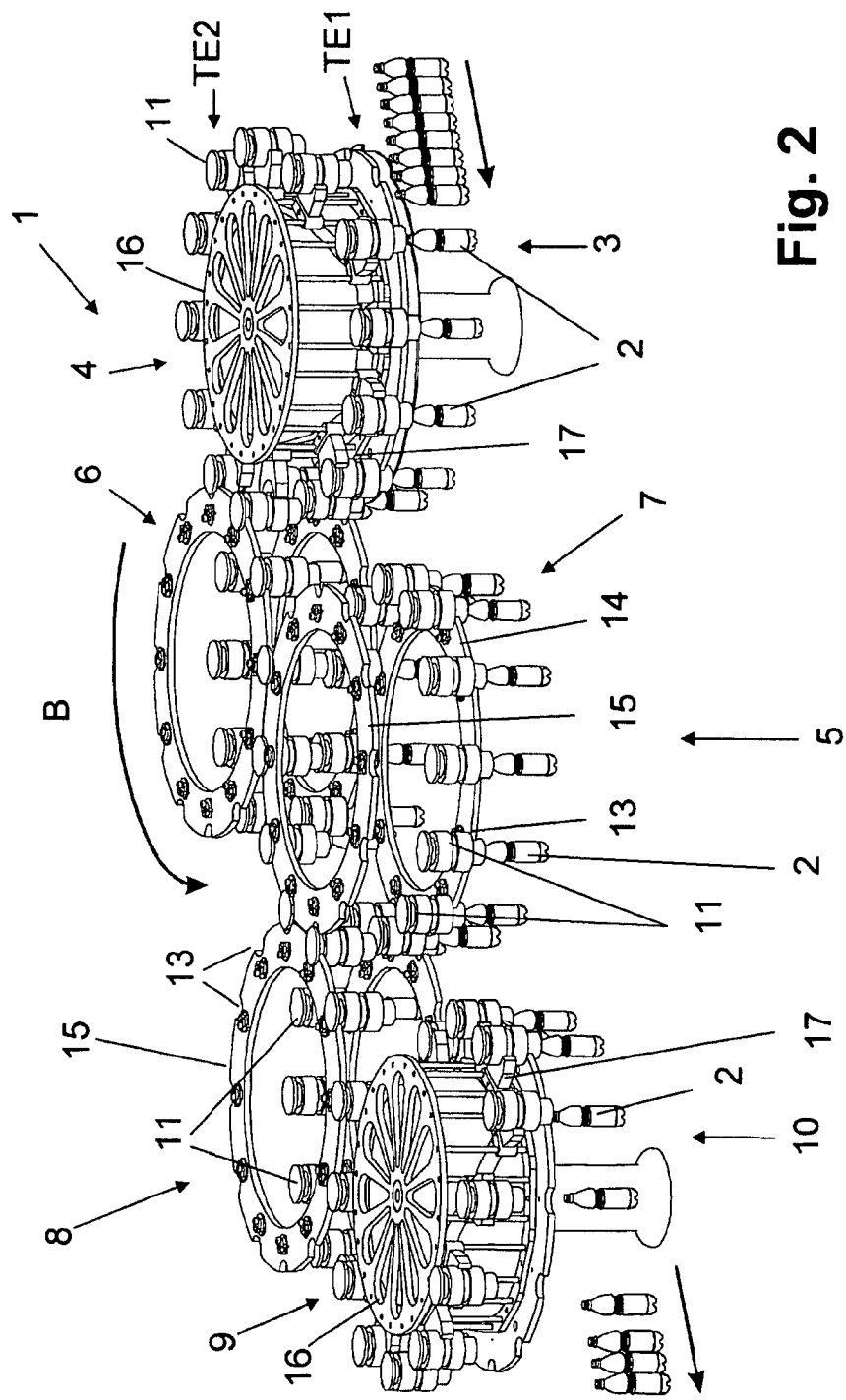
FIG. 2 shows the transport system of FIG. 1 in simplified perspective view.

As shown in FIG. 2, the puck holders 17 of the inlet star 4 can be moved under control in the vertical direction between the transport planes TE1 and TE2 in synchrony with the rotational movement of the inlet star 4. In one embodiment, control arises from control curves such that the holders 17 move on the angular region of the rotary movement of the inlet star 4 between the package inlet 3 and delivery region 19 on the lower transport plane TE1. The pucks 11 holding the package 2 are therefore passed on at the delivery region 19 to puck holders 13 of the transport star 4 in the lower transport plane TE1. At the angular region of the rotary movement of the inlet star 4 between the delivery region 19 and delivery region 20, the puck holders 17 are raised to the upper transport plane TE2 so that they can receive the pucks 11 returned via the puck holders 13 of the upper transport plane TE2 of the transport star 6 at the delivery region 20. FIG. 4 shows in detail how the puck holders 17 are lowered to the lower transport plane TE1 again at the angular region of the rotary movement of the inlet star 4 between delivery region 20 and the package inlet 3. The empty pucks 11.1 without packages are shown in dotted lines or grayed out on the top for clarification.

The packaging holders 17 of the outlet star 9 are also controlled and moved in synchrony with the rotary movement of this star between the lower transport plane TE1 and the upper transport plane TE2 such that they move on the upper transport plane TE1 at the angular region of the rotary movement of the outlet star 9 between the delivery region 22 and the package outlet 10 to receive the pucks 11 with packages 2 from the adjacent transport star 8 and to pass these on at the package outlet 10 on the lower transport plane TE1. In the angular region of the rotary movement of the outlet star 9 between the package outlet 10 and the delivery region 21, the puck holders 17 are raised to the upper transport plane TE2 for delivery of the pucks 11 to the puck holders 13 of the transport star 8 in transport plane TE2. In the angular region of the rotary movement of the outlet star 9 between the delivery region 21 and delivery region 22, the puck holders 17 are lowered again to the lower transport plane TE1.

As shown in FIG. 1, the delivery regions 18-22 are arranged such that, in each case, the greater angular region of the rotary movement of transport stars 6-8 forms the part 12.1 of the transport path 12 running in the lower transport plane TE1 on which the package 2 are treated. In the embodiment shown, at inlet star 4 the puck holders 17 are raised from the lower transport plane TE1 to the upper transport plane TE2 in the short angular region corresponding to a pitch spacing of two puck holders 17, and the puck holders 17 are lowered to the transport plane TE1 at a relatively large angular region of the rotary movement of inlet star 4 corresponding to a multiple pitch spacing of the puck holders 17.

Conversely, at the outlet star 9, the puck holders 17 are lowered to the transport plane TE1 at the smaller angular region corresponding to a pitch spacing of the puck holders 17, and the puck holders 17 are raised at the relatively large angular region of the rotary movement corresponding to a multiple pitch spacing of the puck holders 17.

Since the pucks 11 with the package 2 are moved in transport plane TE1, the distance between the transport planes TE1 and TE2, and in particular the movement stroke of the puck holders 17 between these transport planes, can be kept small, which at least supports the movement stroke of the puck holders 17 on the shorter angular region between the delivery regions 19 and 20, or 21 and 22.

The invention has been explained above with reference to one exemplary embodiment. Evidently changes and derivations are possible without leaving the inventive concept forming the basis of the invention.

LIST OF REFERENCE NUMERALS

1 Transport system
2 Package
3 Package inlet
4 Inlet star
5 Transport route
5.1 Transport route of package
6-8 Transporting element or transport star driven in circulation
9 Outlet star
10 Package outlet
11 Puck
12 Transport path
12.1, 12.2 Part length of transport path 12
13 Puck holder
14, 15 Ring
16 Rotor
17 Puck holder
18-22 Delivery region
A Rotation direction of inlet star 4
B-D Rotation direction of transport stars 6-8
E Rotation direction of outlet star 9

The invention claimed is:

1. An apparatus for transporting packages from a package inlet to a package outlet, said apparatus comprising
a closed transport path comprising a package transport route and a puck return transport route,
a package inlet on said closed transport path,
a package outlet on said closed transport path, said package outlet being displaced from said package inlet in a transport direction for packages, first and second transport elements that are rotatable in a circulation direction and that are adjacent to each other in said transport direction of said packages, and
pucks, each of which is adapted to pick up a package at said package inlet and to carry said package along said package transport route as far as said package outlet,
wherein after release of said packages at said package outlet, said pucks return to said package inlet by way of said puck return transport route, wherein said puck return transport route is provided in a first transport plane, wherein said package transport is provided in a second transport plane, wherein said first and second transport planes are offset from each other in a vertical direction, wherein said first and second transport planes are selected from the group consisting of an upper plane and a lower plane, and wherein said package transport route and said puck return transport route are formed by common transport elements.

2. The apparatus of claim 1, wherein said package transport route and said puck return transport route are formed exclusively by common transport elements.

3. The apparatus of claim 1, wherein said package transport route runs in said lower transport plane, below said puck return transport route.

4. The apparatus of claim 1, wherein said transport elements comprise puck holders for receiving, holding, and delivering pucks from and to adjacent transport elements.

5. The apparatus of claim 1, further comprising first and second delivery regions formed in said upper and lower transport planes following each other in said circulation direction of said first and second transport elements, said first and second delivery regions being disposed between said package inlet and package outlet.

6. The apparatus of claim 1, further comprising control and lifting elements for said first and second transport elements, wherein said control and lifting elements are configured for moving puck holders between said transport planes.

7. The apparatus of claim 5, further comprising printing stations on said transport route for printing on said packages.

8. The apparatus of claim 1, further comprising first and second delivery regions formed in said upper and lower transport planes following each other in said circulation direction of said first and second transport elements, said first and second delivery regions being disposed between said first transport element and a third transport element.

9. The apparatus of claim 1, further comprising first and second delivery regions formed in said upper and lower transport planes following each other in said circulation direction of said first and second transport elements, said first and second delivery regions being disposed between said second transport element and a third transport element.

10. The apparatus of claim 1, wherein said transport elements comprise transport elements that are common to both said package transport route and said puck return transport route.

11. The apparatus of claim 1, wherein said transport elements comprise a first transport element, wherein said first transport element forms part of said package transport route, and wherein said first transport element forms part of said puck return transport route.

12. The apparatus of claim 1, wherein a first transport element is disposed in a region of said package inlet, wherein said first transport element receives pucks returned on said puck return transport route and transfers them from said first transport plane to said second transport plane, wherein a second transport element is disposed at said package outlet, and wherein said second transport element delivers said pucks from said second transport plane back to said first transport plane.

13. The apparatus of claim 12, wherein at least one of said first and second transport elements comprises a star having plural puck holders, wherein said puck holders are spaced apart with a first pitch spacing on a periphery of a rotor that rotates about a vertical machine axis, wherein said puck holders are configured for controlled movement in synchrony with rotational movement of said rotor in a direction parallel to said machine axis between said upper and lower transport planes.

14. The apparatus of claim 13, further comprising a third transport element between said first and second transport elements, wherein said third transport element comprises a transport star that rotates about a third-transport element vertical machine axis, wherein said third transport element comprises puck holders in said two transport planes, wherein said puck holders are distributed about said third-transport element vertical machine axis, wherein said puck holders are spaced apart at a second pitch spacing that matches said first pitch spacing.

15. The apparatus of claim 12, further comprising a third transport element between said first and second transport elements.

16. The apparatus of claim 15, wherein said puck holders of said first, second, and third transport elements all have the same pitch spacing.

17. The apparatus of claim 15, wherein said puck holders of said third transport element form part of said package transport path in said first plane, and said puck holders in said second transport plane are part of said puck transport path in said second plane.

* * * * *